C. A. PFANSTIEHL.
PROCESS FOR WELDING TUNGSTEN INGOTS.
APPLICATION FILED OCT. 15, 1915.
1,267,801.
Patented May 28, 1918.
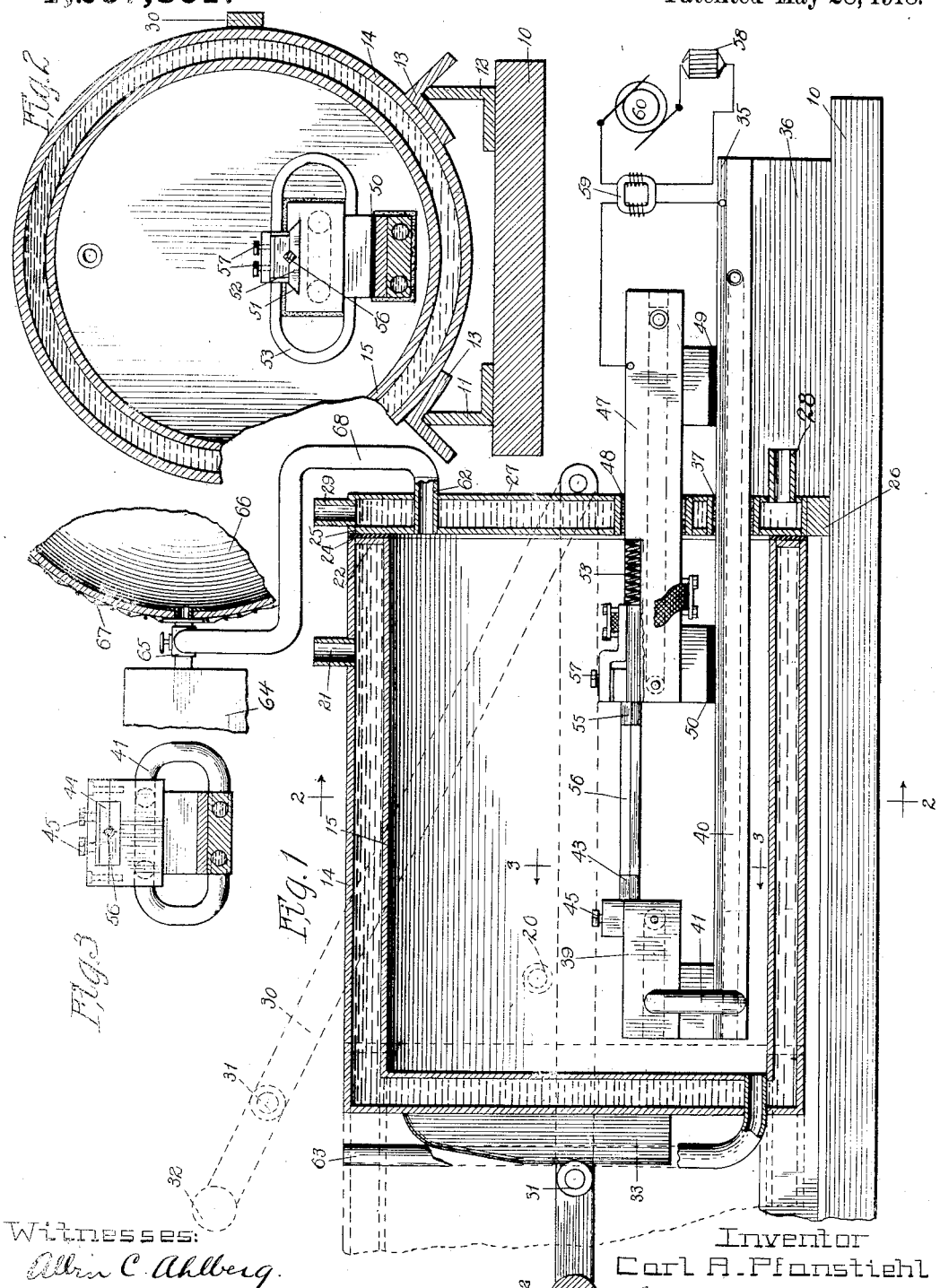
Witnesses:
Albin C. Ahlberg
J. A. Neiburger
Inventor
Carl A. Pfanstiehl
By Williams & Bradbury
Attorneys

UNITED STATES PATENT OFFICE.

CARL A. PFANSTIEHL, OF WAUKEGAN, ILLINOIS, ASSIGNOR TO PFANSTIEHL COMPANY, INC., OF NORTH CHICAGO, ILLINOIS, A CORPORATION OF NEW YORK.

PROCESS FOR WELDING TUNGSTEN INGOTS.

1,267,801.  Specification of Letters Patent.  Patented May 28, 1918.

Application filed October 15, 1915. Serial No. 55,943.

*To all whom it may concern:*

Be it known that I, CARL A. PFANSTIEHL, a citizen of the United States, and a resident of Waukegan, in the county of Lake and State of Illinois, have invented certain new and useful Improvements in Processes for Welding Tungsten Ingots, of which the following is a clear, concise, and exact description, reference being had to the accompanying drawings, forming a part of the specification.

My invention relates to the art of welding tungsten ingots, and more particularly to a process for treating compacted ingots of tungsten particles so that the particles of tungsten will become fused or welded to one another to produce a solid rod of metallic tungsten. My present invention contemplates certain improvements in a process wherein fine particles of metallic tungsten are compressed in a suitable die or mold to form an ingot of sufficient stability to maintain its form while undergoing the fusing or welding operation hereinafter described.

In accordance with my present invention the compacted rod, or ingot of tungsten particles is formed of such dimensions that it will act as a column with flat ends when placed between the jaws or electrodes of a suitable furnace, a preferred form of which is hereinafter fully described. The furnace which I prefer to utilize in carrying out my present process is provided with a pair of electrodes whose flat and parallel opposing surfaces are adapted to engage the tungsten ingot to be welded. The electrodes have preferably the cross sectional shape and area of the ingot to be welded and are preferably formed of tungsten and preferably in part, at least, of tungsten carbid. The electrodes, or jaws, between which the ingot is clamped are provided with water cooled mountings and with connectors adapted to convey a heavy current of electricity to and from the electrodes and thus through the ingot to be welded.

In carrying out my present process I contemplate maintaining the tungsten ingot under a longitudinal compressive stress while the said ingot is being subjected to the welding or fusing operation. A convenient and highly satisfactory arrangement for accomplishing this end is to keep one, or both, of the electrodes of the furnace under pressure, so that the jaws of the electrodes will be pressed into engagement with the ends of the ingot which is clamped in position between them.

In the particular furnace that I preferably employ in carrying out the process of my invention the electrodes and their mountings are supported in a water cooled end-plate which serves as one wall of a hermetically sealed casing surrounding the electrodes and the ingot which is clamped between them. The hood of the hermetically sealed casing is mounted on suitable trackwork such that it can be withdrawn from the position in which it surrounds the electrodes and the ingot to be welded, it being the part of the operator to withdraw this movable portion of the casing while inserting or removing an ingot from the electrodes between which it is fused or welded. After having inserted an ingot between the electrodes or jaws, the operator returns the movable hood of the casing to its normal position in which the ingot to be welded and the electrodes and their mountings are inclosed in a hermetically sealed chamber. The chamber may be exhausted so that the welding operation will occur *in vacuo*, or the casing may be filled with hydrogen or other inert gas. The electrodes between which the ingot is clamped may initially be formed of metallic tungsten substantially identical with that of the product of the welding process hereinafter described. I have found it desirable, however, to sprinkle the tungsten electrodes, and particularly the engaging surfaces of the tungsten electrodes, with carbon in one form or another, as, for example, in the form of graphite, before carrying out the first or the first few of the welding operations. In my opinion, the carbon combines with the tungsten of the electrodes to produce a tungsten carbid which does not fuse or weld with the ingots undergoing treatment. Whatever the action of the carbon and tungsten may be, that is, whether chemical or purely physical, I prefer to refer to the resultant material as carborized tungsten. This preliminary treatment of the electrode apparently has the advantage also of preventing the temperature of the electrodes from rising to a high degree while the temperature of the ingot which is undergoing treatment may be raised practically to the temperature at which tungsten fuses and flows as a molten metal.

I have found that when a compacted ingot of tungsten particles is clamped between the electrodes of the furnace, an electric current may be passed through the ingot to raise its temperature to a point at which the tungsten particles will become fused or welded to one another with the result that the ingot comes from the furnace in the form of a strong cohesive body of metallic tungsten. In carrying out the welding operation I have found it desirable to regulate the current which flows through the ingot so that its temperature will be raised gradually to a point considerably below that of fusion, or welding, and there maintained for several minutes. The current is then increased to such an extent that the temperature of the ingot will be raised almost to the point at which the tungsten will melt and flow. This high degree of temperature may be maintained for such length of time as may be necessary to effect the complete welding of the tungsten particles. I have found in practice that the maintenance of this high temperature for one minute or less is sufficient for the purpose. If the cross-section of the ingot undergoing treatment is of sufficient area and of proper shape, it will act like a column with flat ends so that the pressure of the electrodes upon the ingot will maintain the ingot in alinement between the electrodes even at the highest temperatures, thereby preventing the ingot from buckling or bending when brought to the high temperature necessary to effect the fusion or welding of the particles of which the ingot is formed.

As has been hereinbefore pointed out an essential step in attaining the results of my invention consists in subjecting the ingot under treatment to a longitudinal compressive stress while the said ingot is undergoing the welding or fusing operation. I have found that when the ingot thus subjected to pressure from end to end has been heated to a certain temperature during the welding operation the length of the ingot suddenly becomes materially less without any increase in its transverse cross section. In an ingot of substantially square transverse cross section, three-eighths of an inch on a side and four inches in length, this sudden shortening of the ingot is often as great as one-sixteenth to one-eighth of an inch. The result of this sudden shortening is that the finished ingot is of great density and considerable malleability.

I have found also that if the electrodes of carborized tungsten are clamped firmly on all sides in rather massive mountings of copper or brass, which in turn are amply water-cooled, the electrodes will not become unduly heated. I am not absolutely certain of the reasons for the somewhat remarkable behavior of the apparatus in this respect. I believe that the water cooled mountings of the electrodes act to convey the heat rapidly away from them. I believe, also, however, that the fact that the electrodes are formed of carborized tungsten has some influence on the behavior of the apparatus. I have observed that when a tungsten ingot such as I have described, is clamped between the electrodes of the furnace and a current is conveyed through the ingot, the temperature of the ingot may be raised to a high degree without raising the temperature of the carborized tungsten electrodes to a point at which they are appreciably red. Even at the highest temperatures to which the ingot is brought in the welding operation, the electrodes are very markedly cooler than the ingot. The temperatures at which these operations are carried on are such that it is almost impossible to make accurate measurements of temperature. The temperatures are so high also that the ingot and the electrodes can be observed only when the inclosing chamber is provided with a heavy plate-glass wall and when the observer is equipped with densely smoked or colored glasses. Such observation reveals the fact, however, that there is a very sharp line of demarcation or difference between the temperature of the electrodes and the ingot undergoing treatment. The ingot can be made to glow at a white heat from end to end while the electrodes, even at their extreme ends where they engage the ingot, will be at a temperature so low that they appear to be entirely black, at least by comparison with the white hot ingot which is clamped between them. It may be that the carborized tungsten has or assumes some peculiar property, as, for example, a decreased resistance to the passage of electricity, or an increased conductivity of heat, which is accountable for the above stated phenomena, or it may be that the incompleteness of the mechanical contact between the ingot and the electrodes is such that the heat of the ingot is not conducted to the electrodes at a rate equal to that at which the water-cooled mountings conduct heat away from the electrodes. It may be that the proportions of the electrodes which I have employed have something to do with the success of this type of furnace. I do know that the results herein described are readily attained in an apparatus which I have constructed and operated in accordance with this disclosure, and that equal results are not obtained when pure tungsten electrodes which have not been treated with carbon are used.

In that apparatus I have fused or welded ingots of substantially square cross section, ¼ of an inch on a side and 4 inches in length. The electrodes of tungsten carbid have had cross-sections of the same size and shape as that of the ingot, and the electrodes have projected ¾ of an inch beyond their water-cooled brass mountings. While I have no doubt that other proportions may be employed, I am certain of the results which can be secured with dimensions as above stated.

The metallic tungsten resulting from such treatment as I have above described is apparently a dense metallic tungsten of very considerable strength under compression and of very considerable strength under tension. While it is to a certain extent brittle, it is malleable at room temperature to an extent such that the corners of the rod can be peened or hammered to an extent such that the cross-section of the rod can be changed from square to octagonal.

In the accompanying drawings, Figure 1 is a vertical section of the water-cooled furnace which I desirably employ in carrying out my present process.

Fig. 2 is a section on the line 2—2 of Fig. 1; and

Fig. 3 is a section on the line 3—3 of Fig. 1.

The table or bench 10 has L shaped rails 11 and 12 secured thereon upon the upwardly projecting limb of which the guides 13, attached to the circumference of the outer shell 14 of the furnace, may be freely slid along lengthwise of the L shaped rails 11 and 12.

The inclosing portion of the furnace is about eighteen inches in length and comprises in addition to the outer shell 14, heretofore referred to, an inner shell 15 similar in shape to the outer shell, but spaced therefrom to form a chamber through which water may be circulated by means of the intake tube 20 and discharge tube 21. These two cylindrical cups are attached together at their open ends by means of an annulus 22 which also serves to seal the water chamber before mentioned. A gasket 24 of rubber, asbestos, or other suitable sealing fiber is cemented to the annulus 22 and bears against the periphery of the inner wall 25 of the stationary head 26, which also embraces a water circulating chamber inclosed by the outer wall 27. This chamber is likewise provided with an inlet 28 and a discharge opening 29 by means of which water, or other cooling fluid, may be circulated as rapidly as found desirable to maintain the temperature of the metallic parts low enough that they may be handled.

Suitable means, herein shown as a pair of levers 30 carrying rollers 31 and joined by a handle 32, is provided for pressing the movable portion of the tank firmly against the washer 24 and the stationary portion 26 to accomplish which the rollers 31 engage the cams 33 carried one on each side of the movable portion of the tank.

The electrodes and their supporting means comprise a main water cooled supporting conductor 35 horizontally mounted upon the block 36 located wholly outside of the furnace chamber. The conductor 35 is preferably formed of copper, brass, or other good heat conducting material, and extends through the stationary head 26 wherein it is sealed by the insulating gasket 37. That portion which projects within the furnace chamber must be of sufficient rigidity to need no support at its free end whereon is carried an electrode support 39 of considerable bulk and provided with a chamber connected with the water circulating tubes 40 through the conductor 35 by means of tubular connections 41. The electrode proper 43 is preferably formed of carbonized tungsten and is clamped in the electrode support 39 by means of a movable plate 44, shown more clearly in Fig. 3. The plate 44 is preferably made of copper, as are also the screws 45, so that the heat from the electrode 43 will be readily conducted into the water cooled electrode support 39.

The electrode support shown at the right in Fig. 1 is likewise mounted upon a water cooled conducting member 47 which also extends through the stationary head 26 of the furnace and is insulated therefrom by a washer 48. The outer and inner ends of conductor 47 are spaced from, but attached to, the water cooled conductor 35 by means of blocks of insulation 49 and 50, all of the parts being massive so as to form a rigid structure and one which will readily conduct away heat. The end of the conductor 47 which projects within the furnace chamber has a dovetailed channel 51 formed therein within which is slidably mounted a block 52 against the rear end of which a spring 53 abuts. This movable carrier 52 is provided with electrode mounting means similar to that with which electrode block 39 is equipped, this means serving to hold the tungsten carbid electrode 55 in place by means of screws 57. Although the block 52, and parts carried thereby, are in electrical connection with the conductor 47 the possible resistance of the sliding engagement is reduced by means of a flexible conductor 53 formed of braided or woven copper wire. This has been found necessary in order that the block 52 may be so freely mounted in its guide channel 51 that the spring 53 will readily maintain the tungsten carbid electrode 55 in contact with the end of the tungsten rod 56 despite the expansion and contraction of the tungsten rod or ingot during the welding operation. The pressure of the spring 53 must be sufficient that the parallel ends of the electrodes 43 and 55 will constantly act upon the parallel ends of the tungsten ingot 56 in a manner which will tend to prevent the sagging of the ingot when heated almost to the melting point, and also permit and effect the shortening of the ingot with a resulting increased density when the ingot has been heated to the critical temperature at which this phenomenon occurs.

A peculiar property of tungsten is that when heated barely below the temperature at which it becomes fluid it will withstand a considerable compression, but at this point has practically no tensile strength. Obviously, the arrangement herein described takes advantage of this inherent quality of tungsten.

Since to weld an ingot of the size which I prefer to use, which is about one-sixteenth of a square inch in cross section, requires a maximum current of about 2000 amperes which must be brought gradually to that quantity and again gradually to a minimum of substantially 800 amperes, I have found it convenient and economical to use alternating current and to control this current by means of a variable impedance, herein diagrammatically illustrated at 58, which is connected in circuit with the primary of a suitable transformer 59, and any suitable source of alternating current. The low resistance secondary of the transformer 59 is connected directly to the outer terminals 47 and 35.

In order that the welding operation may be carried on without oxidization which would rapidly occur at the high temperature to which the tungsten ingot must be raised, I have provided inlet and exit connections 62 and 63, by means of which a supply of hydrogen, or other inert gas, may be conducted to and from the furnace chamber. In the drawings I have illustrated somewhat diagrammatically a preferred arrangement for supplying hydrogen to the furnace chamber. At 64 is illustrated a hydrogen tank, or other source of hydrogen supply, connected with a three-way cock 65. At 66 is illustrated a rubber gas bag which may be provided with a suitable woven sheath 67 if desired. The bag 66 is also connected with the cock 65. A suitable conduit 68 extends from the cock 65 to the hydrogen inlet 62 of the furnace chamber. The three-way cock 65, which is of any suitable well-known construction, is designed when in one position to afford communication between the hydrogen tank 64 and the gas bag 66, and when in another position to afford communication between the gas bag and the furnace chamber. Thus, a measured quantity of hydrogen may be readily supplied to the furnace chamber by manipulating the cock 65 to permit the gas bag to fill and then turning the cock to shut off communication with the hydrogen supply and establish communication between the gas bag and the furnace chamber. Obviously, the operation may be carried on *in vacuo* if desired, in which case the tubes 62 and 63 would be suitably connected for exhausting the furnace chamber. I prefer, however, to operate in a medium of hydrogen since the heat conductivity of the hydrogen aids in cooling the ingot after welding so that it may be handled more quickly, and the second operation, therefore, more speedily started.

Although I have referred to the electrodes as constructed of carborized tungsten, I am not sure that the tungsten and carbon are in chemical union. The substance may be formed, as pointed out, by heating tungsten upon which powdered graphite has been sprinkled. Satisfactory results may be obtained by constructing the electrodes of pure tungsten and then applying carbon in powdered form at the time of the first welding operation.

Although the several steps constituting my process, as hereinafter claimed, have, as a matter of convenience, been described in connection with the preferred form of apparatus I appreciate the fact that this particular apparatus need not necessarily be employed in carrying out my process for welding tungsten ingots. The following claims are drawn to cover the process, which may be carried out in various ways and with various heating apparatuses.

Having thus described my invention what I claim as new and desire to secure by United States Letters Patent is:

1. The improvement in the art of sintering tungsten ingots which consists in subjecting the whole of an ingot of compressed tungsten particles to a longitudinal compressive stress and heating the ingot while it is thus subjected to a longitudinal compressive stress.

2. The process which consists in heating an entire ingot of compressed tungsten particles to sintering temperature while the said ingot is being subjected to a longitudinal compressive stress applied at its extremities.

3. The process which consists in heating an ingot of compressed tungsten particles to sintering temperature while the entire ingot is being subjected to a compressive stress.

4. The process which consists in heating an ingot of compressed tungsten powder to sintering temperature throughout its entire length which consists in supporting the ingot to be sintered in an inert atmosphere between cooled carborized tungsten electrodes of substantially the same cross section as the ingot itself and passing an electric current through the electrodes and ingot.

5. The process which consists in heating an entire ingot of compressed tungsten particles to sintering temperature while the said ingot is held in suspension between electrodes of the same cross section as the ingot itself and which exert a yielding compressive stress upon the opposite extremities of said ingot.

6. The process which consists in clamping a tungsten ingot between a pair of carborized tungsten electrodes abutting against the opposite ends of the ingot, and passing an electric current through the electrodes and ingot.

In witness whereof, I hereunto subscribe my name this 1st day of October, A. D. 1915.

CARL A. PFANSTIEHL.

Witnesses:
A. G. McCaleb,
H. A. Neiburger.